US008405850B2

(12) United States Patent
Kawai

(10) Patent No.: US 8,405,850 B2
(45) Date of Patent: Mar. 26, 2013

(54) IMAGE FORMING APPARATUS WITH SUPPLY UNIT VERIFICATION, PRINT CONTROL METHOD THEREOF AND PRINT CONTROL PROGRAM

(75) Inventor: Atsushi Kawai, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1133 days.

(21) Appl. No.: 12/144,476

(22) Filed: Jun. 23, 2008

(65) Prior Publication Data

US 2008/0316533 A1 Dec. 25, 2008

(30) Foreign Application Priority Data

Jun. 22, 2007 (JP) ................................. 2007-165661

(51) Int. Cl.
*G06F 3/12* (2006.01)

(52) U.S. Cl. .............. 358/1.15; 358/1.1; 347/7; 347/19; 347/85; 347/86; 347/214; 399/12

(58) Field of Classification Search ................. 358/1.15, 358/1.1; 347/7, 85–86, 19, 214; 399/12
See application file for complete search history.

(56) References Cited

U.S. PATENT DOCUMENTS 6,625,402 B2 9/2003 Takemoto
2002/0131784 A1* 9/2002 Takemoto ....................... 399/12
2006/0204250 A1 9/2006 Ishihara et al.
2007/0079125 A1* 4/2007 Adkins et al. ................. 713/176
2008/0071626 A1* 3/2008 Hill ................................ 705/22

FOREIGN PATENT DOCUMENTS

JP 2000-246921 9/2000
JP 2003-122204 A 4/2003
JP 2003-195705 A 7/2003
JP 2004-62078 2/2004
JP 2004062078 A * 2/2004
JP 2006-267601 10/2008

OTHER PUBLICATIONS

Japanese Office Action mailed on May 19, 2009 directed at counterpart application No. 2007-165661; 6 pages.
Japanese Notification of Reasons for Refusal mailed May 11, 2010, directed to counterpart Japanese Patent Application No. 2007-165661; 4 pages.

* cited by examiner

*Primary Examiner* — Jacky X Zheng
(74) *Attorney, Agent, or Firm* — Morrison & Foerster LLP

(57) ABSTRACT

An image forming apparatus comprises an image former that prints target data on a sheet, a first judger that judges a supply unit that is replaceably loaded thereon and has a memory storing identification information uniquely given to the supply unit and information about a plurality of vendors providing the supply unit, is whether or not a reproduced product, an accessor that accesses a server owned by a vendor supplying the supply unit according to the information about the vendors providing the supply unit, which is stored in the memory of the supply unit, if the first judger judges that the supply unit is a reproduced product, a second judger that judges whether or not the identification information stored in the memory of the supply unit is registered in the server owned by the vendor supplying the supply unit, which is accessed by the accessor. Print operations performed by the image former are limited if the second judger judges that the identification information is not registered in the server, meanwhile, print operations performed by the image former are permitted if the second judger judges that the identification information is registered in the server.

13 Claims, 6 Drawing Sheets

Memory Mapping for A Toner Cartridge

100

| Address | Page (Mode) | Title of Data | Default Data(8 bits) | Memo |
|---|---|---|---|---|
| 00H | ROM | Model Identification | Model Identification Code | |
| 01H | | Color Identification | Color Identification Code | |
| 02H | | Not occupied | FFH | |
| 03H | | Production Date | Production Date | |
| 04H | | | | |
| 05H | | Toner Cartridge ID | Toner Cartridge ID | |
| 06H | | | | |
| 07H | | | | |
| 08H | | | | |
| 09H | | Third Party Vendor Information-1 | IP Addess-1 | |
| 0AH | | | | |
| 0BH | | | | |
| 0CH | | | | |
| 0DH | | Third Party Vendor Information-2 | IP Addess-2 | |
| 0EH | | | | |
| 0FH | | | | |
| 10H | | | | |
| 11H | | Third Party Vendor Information-3 | IP Addess-3 | |
| 12H | | | | |
| 13H | | | | |
| 14H | | | | |
| 15H | | Third Party Vendor Information-4 | IP Addess-4 | |
| 16H | | | | |
| 17H | | | | |
| 18H | | | | |
| 19H | | Third Party Vendor Information-5 | IP Addess-5 | |
| 1AH | | | | |
| 1BH | | | | |
| 1CH | | | | |
| : | | | | |
| 1FH | | | | |
| 20H | OTP | New Product Information | New Product Information (Brand-new:FFh Reproduced:FEh Empty:FCh) | |
| : | | | | |
| 2FH | | | | |
| 30H~7FH | R/W | Occupied for printer control | Remaining amount of toner,etc. | |

FIG.4

IMAGE FORMING APPARATUS WITH SUPPLY UNIT VERIFICATION, PRINT CONTROL METHOD THEREOF AND PRINT CONTROL PROGRAM

This application claims priority under 35 U.S.C. §119 to Japanese Patent Application No. 2007-165661 filed on Jun. 22, 2007, the entire disclosure of which is incorporated herein by reference in its entirety.

BACKGROUND OF THE INVENTION

1. Field of the Invention

The present invention relates to an image forming apparatus such as a copier, a printer or a MFP (Multi Function Peripheral) that is a multifunctional digital machine collectively having the copy and print functions, a print control method to control the image forming apparatus, and a print control program stored in a computer readable recording medium to make a computer of the image forming apparatus execute processing.

2. Description of the Related Art

The following description sets forth the inventor's knowledge of related art and problems therein and should not be construed as an admission of knowledge in the prior art.

Such an image forming apparatus mentioned above uses supply units such as toner cartridges and imaging units. Each supply unit contains a consumable portion such as toner consumed due to operations repeatedly performed to print target data on a sheet or a photoconductive drum gradually deteriorated also due to repeated print operations. Each supply unit is replaced with a new one when its consumable portion runs out or reaches to the end of usefulness.

Some of the supply units used in an image forming apparatus are proper products provided from the manufacturer of the image forming apparatus, and the other supply units are un-proper products provided from what are called third party vendors other than that manufacturer. Meanwhile, some of the supply units are new and not reproduced products, and the other supply units are reproduced products which consumable portions are refilled or replaced with new ones. Further, many of the new products are proper products, and many of the reproduced products are un-proper products provided from third party vendors.

Generally, supply units such as toner cartridges provided from third party vendors, have more possibilities of causing quality troubles and mismatch with image forming apparatuses, compared to proper products.

There is a heretofore known art that may work out the case above according to Japanese Unexamined Laid-open Patent Publication No. 2003-195705, and wherein, when a supply unit is replaced with a new one, a user is requested to enter a code, and if the entered code does not correspond to any of the codes of the proper products having been used before, it is judged that the new supply unit is a un-proper product, then print operations are prohibited.

There is another heretofore known art according to Japanese Unexamined Laid-open Patent Publication No. 2003-122204, and wherein, when a supply unit is replaced with a new one, identification information is read out from a memory of the supply unit then transmitted to a service center, and authentication information is received therefrom in return, and if the authentication information is negative, it is judged that the new supply unit is a un-proper product, then image forming operations are limited.

However, supply units of good quality actually have few possibilities of causing a trouble during usage, even if those are un-proper products provided from third party vendors. For example, a supply unit has few possibilities of causing a trouble during usage, if it is provided from a third party vendor which product quality is guaranteed by the manufacturer of the image forming apparatus. Further, it would be advantageous if un-proper supply units provided from third party vendors become freely used, since users have more product choices.

On the contrary, with the art disclosed in the publications above, the prospect of using un-proper supply units provided from third party vendors is excluded. Thus, it is disadvantageous that users cannot arbitrarily select and purchase a preferable one among un-proper supply units of good quality.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image forming apparatus that enables users to have more choices of supply units, for example, enables users to select a supply unit even if it is a un-proper product reproduced by a third party vendor that is other than the manufacturer of the image forming apparatus.

It is another objective of the present invention to provide a print control method to control the image forming apparatus, which enables users to select a supply unit even if it is a un-proper product reproduced by a third party vendor that is other than the manufacturer of the image forming apparatus.

It is yet another objective of the present invention to provide a print control program stored in a computer readable recording medium to make a computer of the image forming apparatus execute processing by the print control method mentioned above.

According to a first aspect of the present invention, an image forming apparatus comprises:

an image former that prints target data on a sheet;

a first judger that judges a supply unit that is replaceably loaded thereon and has a memory storing identification information uniquely given to the supply unit and information about a plurality of vendors providing the supply unit, is whether or not a reproduced product;

an accessor that accesses a server owned by a vendor supplying the supply unit according to the information about the vendors providing the supply unit, which is stored in the memory of the supply unit, if the first judger judges that the supply unit is a reproduced product;

a second judger that judges whether or not the identification information stored in the memory of the supply unit is registered in the server owned by the vendor supplying the supply unit, which is accessed by the accessor; and a controller that limits print operations performed by the image former if the second judger judges that the identification information is not registered in the server, meanwhile, permits print operations performed by the image former if the second judger judges that the identification information is registered in the server.

According to a second aspect of the present invention, a print control method to control the image forming apparatus comprises:

judging that a supply unit that is replaceably loaded on the image forming apparatus and has a memory storing identification information uniquely given to the supply unit and information about a plurality of vendors providing the supply unit, is whether or not a reproduced product;

accessing a server owned by a vendor providing the supply unit according to the information about the vendors providing the supply unit, which is stored in the memory of the supply unit, if it is judged that the supply unit is a reproduced product;

judging whether or not the identification information stored in the memory of the supply unit is registered in the server owned by the vendor providing the supply unit, which is accessed in the prior step; and limiting print operations if it is judged that the identification information is not registered in the server, meanwhile, permitting print operations if it is judged that the identification information is registered in the server.

According to a third aspect of the present invention, a print control program to control the image forming apparatus is stored in a computer readable recording medium to make a computer of the image forming apparatus execute:

judging that a supply unit that is replaceably loaded on the image forming apparatus and has a memory storing identification information uniquely given to the supply unit and information about a plurality of vendors providing the supply unit, is whether or not a reproduced product;

accessing a server owned by a vendor providing the supply unit according to the information about the vendors providing the supply unit, which is stored in the memory of the supply unit, if it is judged that the supply unit is a reproduced product;

judging whether or not the identification information stored in the memory of the supply unit is registered in the server owned by the vendor providing the supply unit, which is accessed in the prior step; and limiting print operations if it is judged that the identification information is not registered in the server, meanwhile, permitting print operations if it is judged that the identification information is registered in the server.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view showing address mapping for a memory chip loaded on a toner cartridge;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
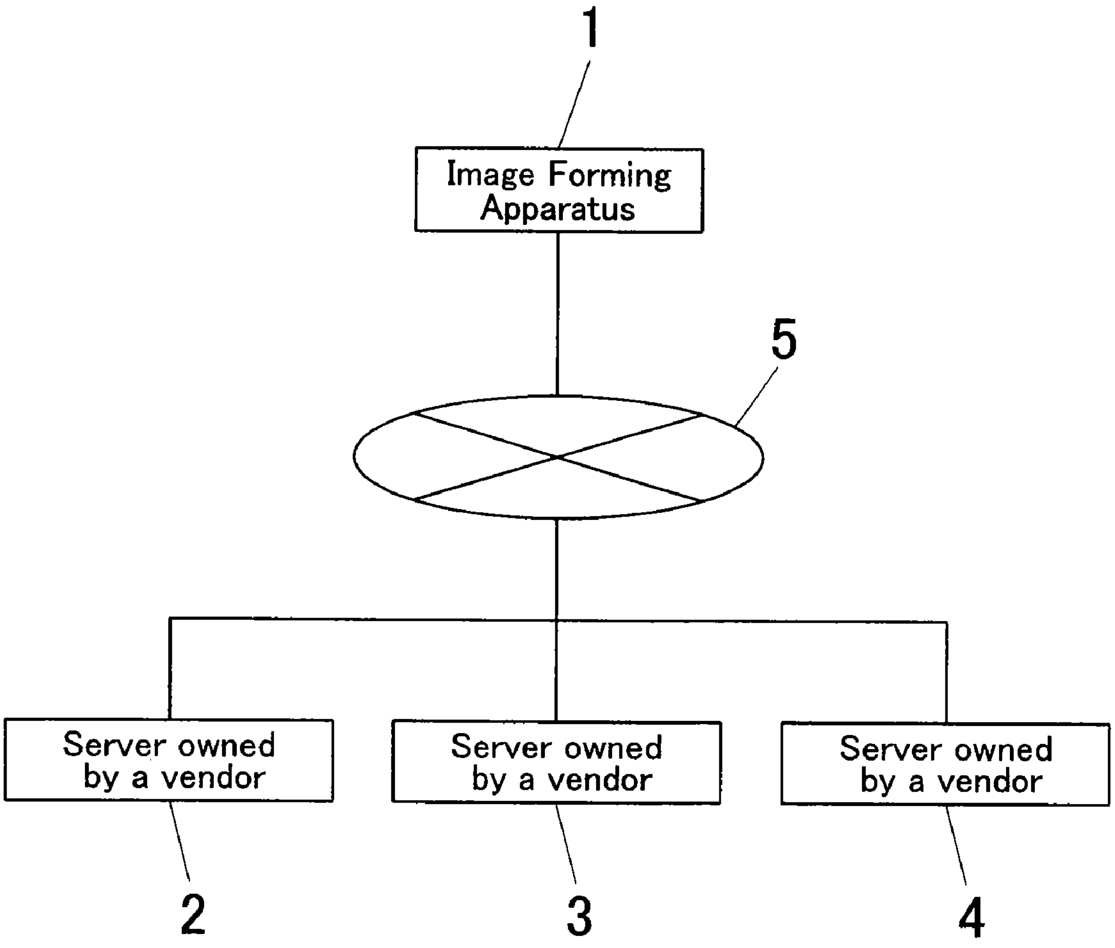
FIG. 1 is a view showing a configuration of a supply unit recycling system in which an image forming apparatus according to one embodiment of the present invention is employed.

FIG. 1 is a view showing a configuration of a supply unit recycling system in which an image forming apparatus according to one embodiment of the present invention is used.

As shown in FIG. 1, this recycling system comprises an image forming apparatus 1 such as a MFP that is a multifunctional digital machine, and servers 2, 3 and 4 owned by vendors providing supply units. The image forming apparatus 1 and the servers 2, 3 and 4 are interconnected via the Internet 5 to exchange data with each other.

Figure 2:
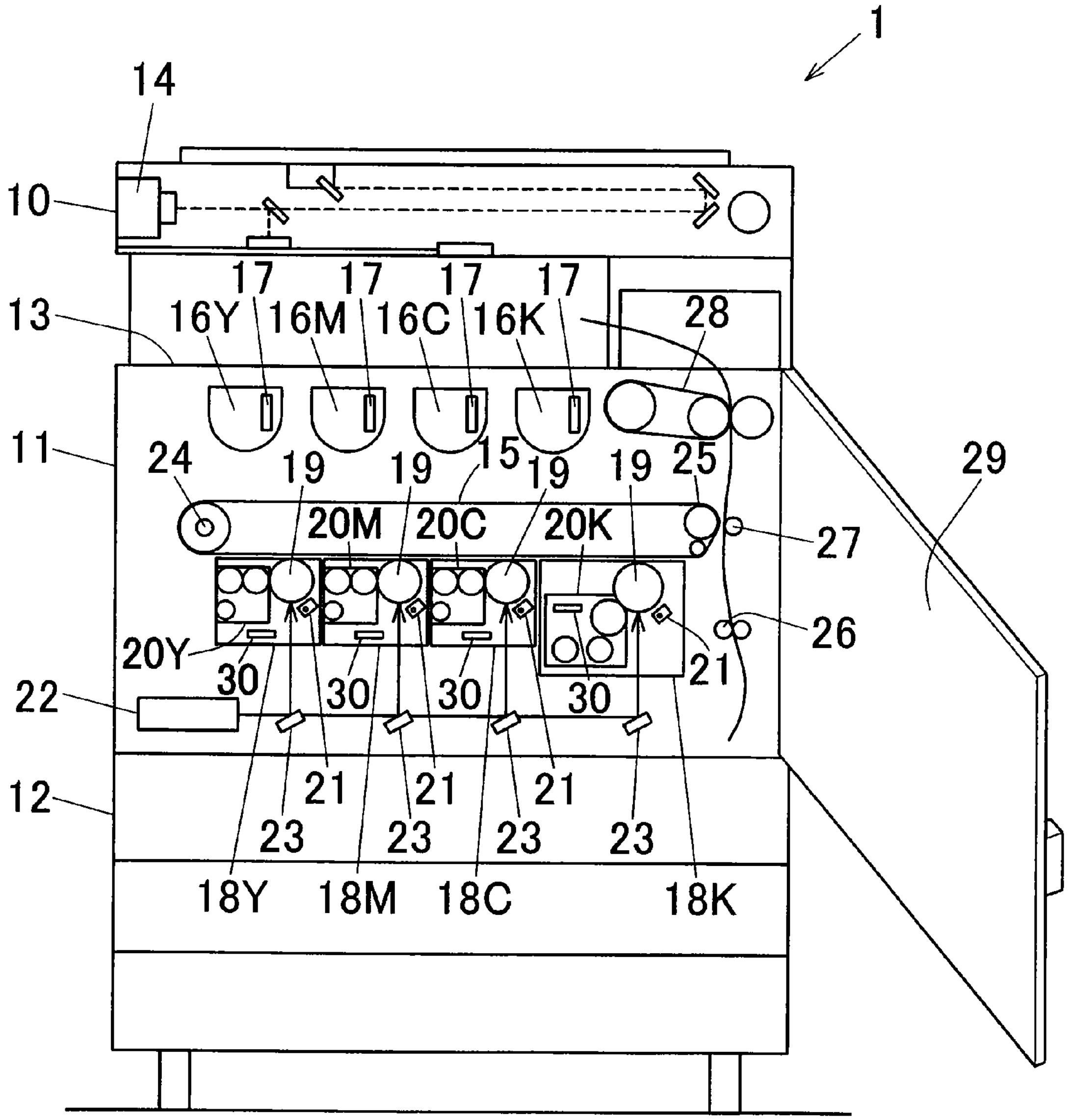
FIG. 2 is a view showing a configuration of an image forming apparatus used in this system of FIG. 1.

FIG. 2 is a view showing a configuration of the image forming apparatus 1 mentioned above.

As shown in FIG. 2, the image forming apparatus 1 comprises a scanner 10, an image former 11, a sheet feeder 12, a discharge tray 13 and etc.

The scanner 10 comprises a CCD sensor 14 and reads a document placed on an automatic document feeder or a platen glass (neither of them is shown in Figures).

The image former 11 prints on a sheet, image data read out from a document by the scanner 10, and print data and other data received from outside. In this embodiment, the image former 11 comprises imaging units 18Y, 18M, 18C and 18K, toner cartridges 16Y, 16M, 16C and 16K, an intermediate transfer belt 15, an exposure portion 22, polygon mirrors 23, a conveyer roller 26, a second transfer roller 27, a fixer 28 and etc.

The imaging units 18Y, 18M, 18C and 18K form a toner image by actualizing an electrostatic latent image by using toner, and are provided to express Yellow (Y), Magenta (M), Cyan (C) and Black (K), respectively. Each of the imaging units is one unit collectively having a photoconductive drum 19 that is revolvable, a charger 21 that charges the photoconductive drum 19, a developer 20Y, 20M, 20C or 20K that develops a toner image by transferring toner to an electrostatic latent image formed on the surface of the photoconductive drum 19, and other portions.

The photoconductive drum 19 and others included in the imaging units 18Y, 18M, 18C and 18K are consumable portions that are gradually deteriorated due to repeated print operations and eventually reach to the end of usefulness. Therefore, the imaging units 18Y, 18M, 18C and 18K are supply units that are replaced with new ones when their consumable portions reach to the end of usefulness. The imaging units are replaceably loaded on the image forming apparatus 1, and a front door 29 thereof can be opened for replacement. Further, the imaging units 18Y, 18M, 18C and 18K load a memory chip 30 storing in itself, information about the imaging unit, 18K, 18M, 18C and 18K, respectively.

The toner cartridges 16Y, 16M, 16C and 16K contain toner to express Yellow (Y), Magenta (M), Cyan (C) and Black (K) and supply that toner to the imaging unit 16Y, 16M, 16C and 16K, respectively.

The toner contained in the toner cartridges 16Y, 16M, 16C and 16K is also consumed due to repeated print operations. Therefore, the toner cartridges 16Y, 16M, 16C and 16K are supply units that are replaced with new ones when toner runs out. The toner cartridges are replaceably loaded on the image forming apparatus 1, and the front door 29 thereof can be opened for replacement. Further, the toner cartridges 16Y, 16M, 16C and 16K load a memory chip 17 storing in itself, information about the toner cartridge 16Y, 16M, 16C and 16K, respectively. Detailed explanation will be provided later.

The intermediate transfer belt 15 obtains layers of toner images that are formed on the surface of the photoconductive drum 19 of the imaging units 18Y, 18M, 18C and 18K, respectively. The intermediate transfer belt 15 is hung over a driving roller 24 and a driven roller 25, and is driven in cycles in a determined direction.

The exposure portion 22 forms an electrostatic latent image on the surface of the photoconductive drum 19 by irradiating with a laser light the charged photoconductive drum 19 of the imaging units 18Y, 18M, 18C and 18K.

The polygon mirrors 23 deflect the laser light irradiated by the exposure portion 22 to make it scan the surface of the photoconductive drum 19.

The conveyer roller 26 conveys to the second transfer position, a sheet fed by the sheet feeder 12. The second transfer roller 27 transfers the toner images transferred to the intermediate transfer belt 15 in the first transfer step, to the sheet conveyed by the conveyer roller 26. The fixer 28 properly fixes the toner images transferred to the sheet.

The sheet feeder 12 holds in itself, sheets organized by types. When a print instruction is issued, the sheet feeder 12 provides sheets one by one, then the conveyer roller 26 conveys the sheets to the second transfer position.

The discharge tray 13 receives the sheets carrying the toner images fixed by the fixer 28 thereon, which are discharged to outside.

Figure 3:
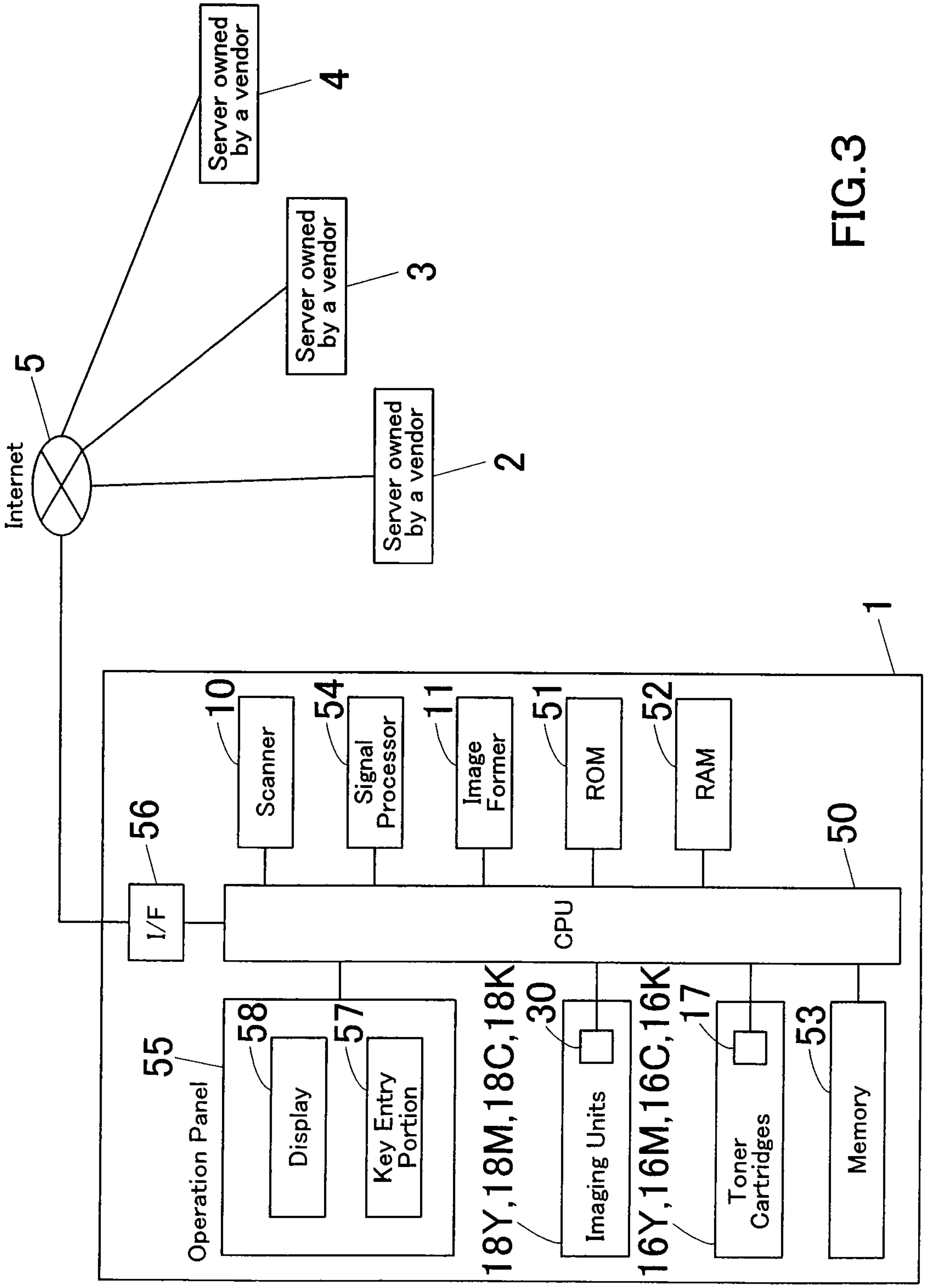
FIG. 3 is a view showing an electrical configuration of the image forming apparatus.

FIG. 3 is a block diagram showing an electrical configuration of the image forming apparatus 1.

As shown in FIG. 3, the image forming apparatus 1 comprises a scanner 10, an image former 11, toner cartridges 16Y, 16M, 16C and 16K, imaging units 18Y, 18M, 18C and 18K, a CPU 50, a ROM 51, a RAM 52, a memory 53, a signal processor 54, an operation panel 55, a communication interface (I/F) 56 and etc. Since the scanner 10, the image former 11, the toner cartridges 16Y, 16M, 16C and 16K, and the imaging units 18Y, 18M, 18C and 18K are already explain above, another explanation is omitted.

The CPU 50 centrally controls the entire image forming apparatus 1 by executing an operation program stored in the ROM 51. In this embodiment, for example, when the occurrence of toner empty of the toner cartridge 16Y, 16M, 16C or 16K is detected or life information indicating the end of usefulness of the imaging unit 18Y, 18M, 18C or 18K is detected, and thereby the toner cartridge or the imaging unit is replaced with a new one, then a new toner cartridge or imaging unit is judged as whether or not a reproduced product, i.e. whether a new or reproduced product. And if it is judged as a reproduced product, identification information and information about vendors providing the supply unit, which are stored in the memory chip 17 of the toner cartridge or the memory chip 30 of the imaging unit, are read out therefrom. Here, "reproduced product" means a supply unit which consumable portion such as toner or a photoconductive drum is refilled or replaced with a new one in order to be reused later. Further, under the control of the CPU 50, an access to the sever 2, 3 or 4 owned by a vendor is made via the Internet 5 according to the readout vendor information, and it is judged whether or not the identification information read out from the memory chip is registered in that server. And then print operations are controlled depending on the judgment result. Detailed explanation will be provided later.

The ROM 51 stores in itself a program executed by the CPU 50 and other data.

The RAM 52 functions as an operation area for the CPU 50 to execute a program, and temporarily stores in itself a program, data used when a program is executed, and other data.

The memory 53 is a recording medium such as a hard disk drive, and stores in itself image data read out from a document by the scanner 10, various programs and other data.

The signal processor 54 processes inputted image data by converting signals in a predetermined manner.

The operation panel 55 displays on itself various messages and etc., and is used by users to perform various entries. And it comprises a key entry portion 57, a display 58 and etc.

The key entry portion 57 comprises a plurality of keys such as numeric keys and a start key, and is used by users to issue an instruction to the image forming apparatus 1. The display 58 shows users various screens, messages and etc., and comprises a crystal liquid touch panel and etc.

The communication interface (I/F) 56 functions as a communicator that exchanges data with the servers 2, 3 and 4 via the Internet 5.

Meanwhile, the servers 2, 3 and 4 of the venders have their own databases, respectively. And identification information uniquely given the respective supply units reproduced by those vendors are registered in their own databases. As to be detailed later, the identification information are given to new supply units when those are produced by the manufacturer of the image forming apparatus 1, and correspond to the identification information stored in the memory chips 17 and 30.

Hereinafter, address mapping for the memory chip 17 loaded on the toner cartridges 16Y, 16M, 16C and 16K mentioned above, will be explained with reference to FIG. 4.

As shown in the memory address mapping 100 of FIG. 4, the memory chip 17 has three different kinds of recording area, which are the addresses 00H through 1FH of recording area, the addresses 20H through 2FH of recording area and the addresses 30H through 7FH of recording area. Each address can hold information up to 8 bits.

Once data is written into the addresses 00H through 2FH of recording area during the production process, no more data is permitted to be written therein after that. That is, the recording area is only readable (it is a ROM area).

In this recording area, a model identification code indicating the type of the toner cartridge, a color identification code indicating the color of toner filled in the toner cartridge, a production date of the toner cartridge, identification information to identify the toner cartridge (this is written as "toner cartridge ID" in FIG. 4, and will be referred to also as "ID" hereinafter), are stored. The addresses 05H through 08H of recording area capable of holding information up to 4 bytes, is reserved for the ID that can be any one from 0 to 4294967295, which should be sufficient even if each toner cartridge has its own ID given thereto.

Further, in this ROM area, access information of the vendors, which are the IP addresses of the servers 2, 3 and 4, are stored as information about a plurality of vendors providing supply units, and each of the IP addresses is stored by using the 4 bytes of capacity.

As shown in FIG. 4, in this embodiment, access information of the third party vendors which product quality is guaranteed by the manufacturer of the image forming apparatus 1, are stored as information about a plurality of vendors providing supply units, for example. However, all the vendors which access information are stored in the memory chip, are not necessarily third party vendors, and the vendors which access information are stored therein may include a vendor supplying proper products, which is the manufacturer of the image forming apparatus 1.

The addresses 20H through 2FH of recording area is one time programmable (it is an OTP area), and new product information indicating that the toner cartridge is whether or not a new or reproduced product, is stored therein.

Concretely, "FFh" is written therein when a new toner cartridge is shipped out, and it is rewritten to "FEh" when the toner cartridge is loaded on the image forming apparatus 1, and then it is written to "FCh" when the toner cartridge runs out of toner. Therefore, by reading out this information therefrom, the toner cartridge can be judged whether a new or reproduced product.

The addresses 30H through 7FH of recording area is repeatedly rewritable (it is a R/W area), and information for controlling the image forming apparatus 1, such as the remaining amount of toner, is written therein.

As described above in this embodiment, the ID and the access information are written in the ROM area when the toner cartridge is shipped from the factory, and are not permitted to be rewritten after that. That could remove the risk that someone accidentally edits these information.

Further, the new product information of the toner cartridge is stored in the OTP area, in which each bit can be changed only from "1" to "0", in other words, this information cannot be changed to other information indicating it is a new product, for example. That could remove the risk that someone accidentally edits the new product information.

Meanwhile, since address mapping for the memory chip 30 of the imaging units 18Y, 18M, 18C and 18K is exactly the same as that of the memory chip 17 of the toner cartridges, explanation thereof is omitted here.

Figure 5:
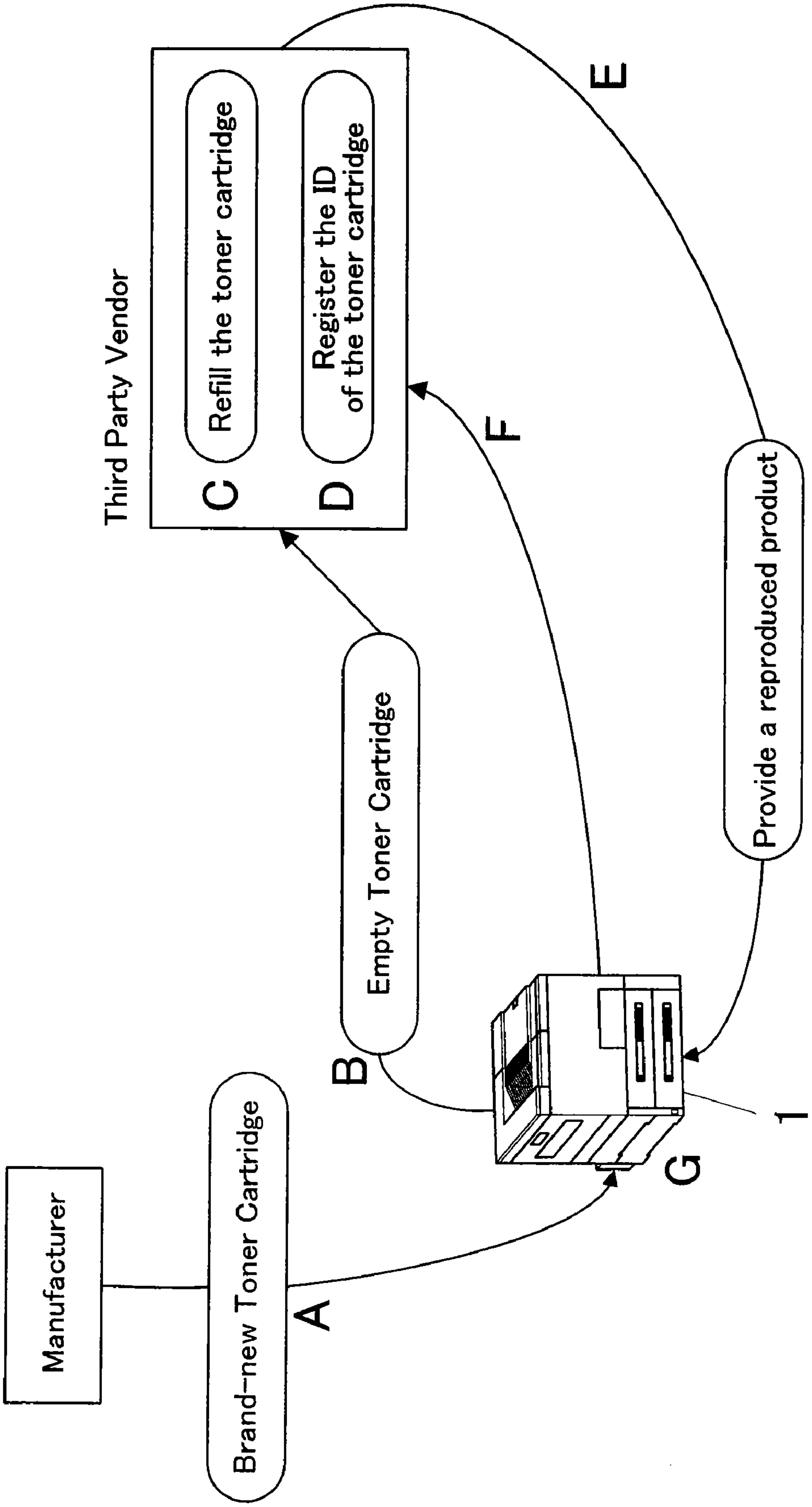
FIG. 5 is a view to explain the flow of a toner cartridge, data and etc. in the entire system.

Hereinafter, the flow of a toner cartridge, data and etc. in the supply unit recycling system shown in FIG. 1, will be explained with reference to FIG. 5. The manufacturer of FIG. 5 corresponds to the manufacturer of the image forming apparatus 1, which provides new toner cartridges. And product quality of the third party vendor providing supply units is guaranteed by the manufacturer of the image forming apparatus 1. The third party vendor reproduces toner cartridges by refilling empty toner cartridges.

A: Initially, the manufacturer of the image forming apparatus 1 ships out the image forming apparatus 1 carrying new toner cartridges therein. The manufacturer of the image forming apparatus 1 preliminarily stores in the ROM area of the memory chip 17 of the new toner cartridges, access information (IP addresses) of a plurality of vendors that are approved to provide reproduced toner cartridges, and identification information uniquely given to the toner cartridges.

B: When toner empty occurs to one of the toner cartridges loaded on the image forming apparatus 1, a vendor providing supply units, which is a third party vendor, collects the empty toner cartridge.

C: This third party vendor makes a reproduced product by refilling the collected toner cartridge.

D: This vendor providing supply units reads out from the memory chip 17 of the reproduced toner cartridge, the ID preliminarily stored therein by the manufacturer of the image forming apparatus 1, and then registers this ID in a database of this vendor's owning the server 2, 3 or 4. This vendor is enabled to read out IDs by using an ID reading apparatus or etc. that is provided by the manufacturer of the image forming apparatus 1.

E: A reproduced toner cartridge is returned to the user.

F: When this reproduced toner cartridge is loaded on the image forming apparatus 1, the image forming apparatus 1 makes access to a server according to the access information stored in the memory chip, and searches a database of this server. And then it is judged whether or not there exists in the database, the ID stored in the memory chip of the toner cartridge loaded on the image forming apparatus 1.

G: If there exists that ID therein, it means that the loaded toner cartridge is a reproduced product provided from a third party vendor which product quality is guaranteed by the manufacturer of the image forming apparatus 1. Therefore, the image forming apparatus 1 permits print operations to be performed using this toner cartridge. If there does not exist that ID therein, the image forming apparatus 1 limits print operations from being performed using this toner cartridge. In addition, if it is judged that there exists the ID of the toner cartridge in the database of the vendor's owning server 2, 3 or 4, that ID is deleted therefrom for another recycling routine.

[Operations of the Image Forming Apparatus 1]

Figure 6:
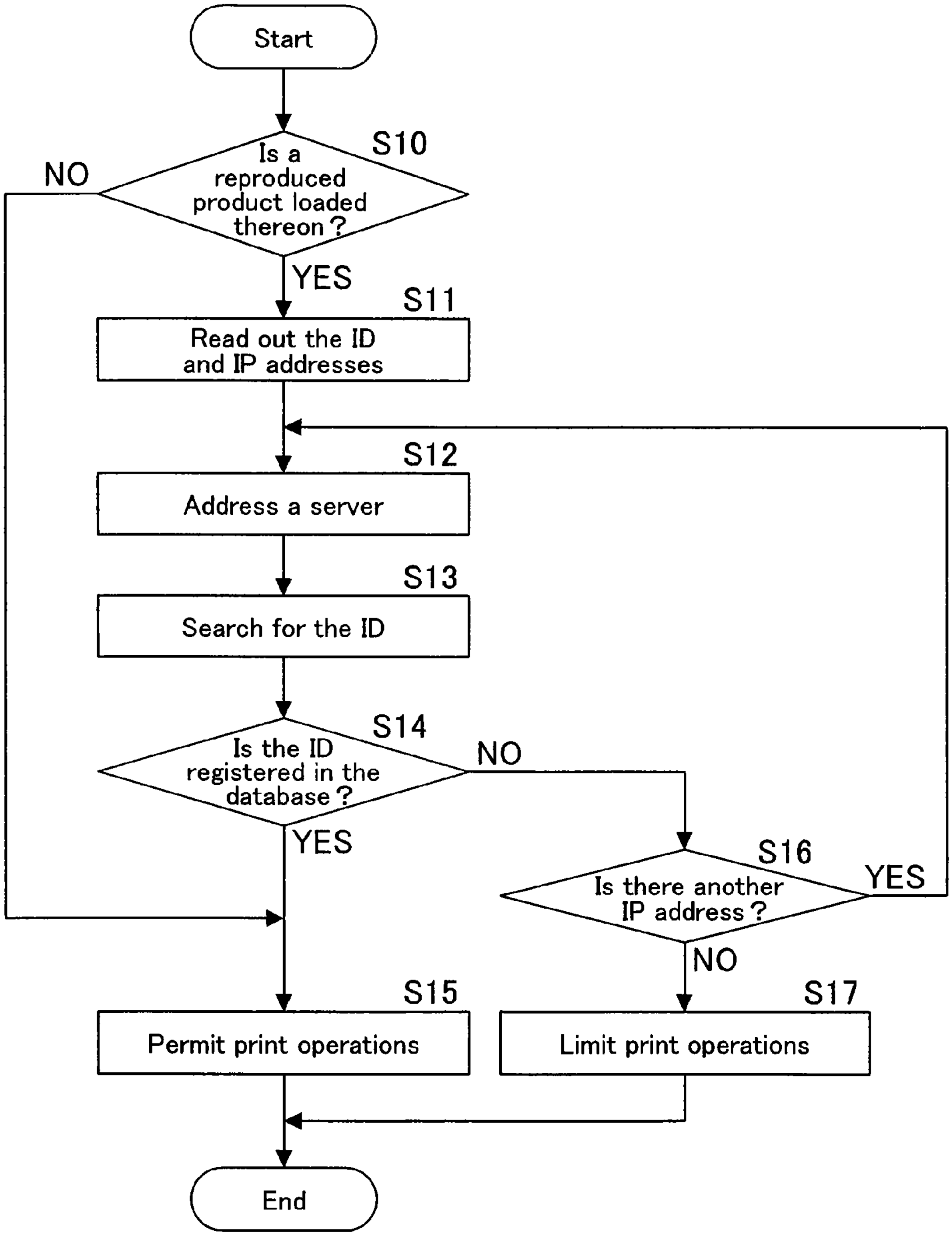
FIG. 6 is a flowchart showing a procedure executed in the image forming apparatus.

Hereinafter, a procedure executed in the image forming apparatus 1 will be explained with reference to a flowchart shown in FIG. 6. This procedure starts when a new toner cartridge 16Y, 16M, 16C or 16K is loaded as replacement, and terminates when a decision whether to permit or limit print operations is made. This procedure is executed by the CPU 50 according to an operation program stored in a recording medium such as the ROM 51.

If a toner cartridge that is returned from a vendor providing supply units is loaded on the image forming apparatus 1, it is judged whether or not the toner cartridge is a reproduced product (Step S10). As previously described, this judgment is made based on new product information stored in the memory chip 17 of the toner cartridge.

If it is not a reproduced product (NO in Step S10), the toner cartridge loaded thereon is a new product. Therefore, since the toner cartridge is highly likely to be a proper product, the routine directly proceeds to Step S15, in which print operations are permitted.

If it is a reproduced product (YES in Step S10), the ID of the toner cartridge and the IP addresses of all the vendors providing the supply unit are read out from the memory chip 17 thereof (Step S11). And an access to one of the readout ID addresses is made, e.g. an access to a server (for example, the server 2) owned by one of the vendors providing the supply unit (Step S12), then the ID of the toner cartridge, which is read out from the memory chip 17, is searched through the database of the server (Step S13).

Based on the searching result, it is judged whether or not that ID is registered in the database (Step S14). If that ID is not registered in the database (NO in Step S14), the routine proceeds to Step S16, in which it is judged whether or not there is another IP address that is access information to be used for next access, in the information read out from the memory chip 17.

If there is another IP address (YES in Step S16), the routine returns to Step S12 and repeats Steps S12, S13, S14 and S16 until it is judged in Step S14 that the ID is registered in the database, or until it is judged in Step S16 that there is no more IP address.

If it is judged that the ID is registered in the database (YES in Step S14), print operations are permitted since the toner cartridge is a reproduced product provided from a third party vendor which product quality is guaranteed by the manufacturer of the image forming apparatus 1 (Step S15). Meanwhile, if there is no more IP address in Step S16 (NO in Step S16), print operations are limited since the toner cartridge is a reproduced product provided from a vendor other than the ones which access information are stored in the memory chip 17 (Step S17). The ID that is judged to be registered in the database is deleted from the servers 2, 3 or 4 owned by the vendor.

Subsequently, depending on the judgment, print operations are executed or limited.

Limiting print operations may correspond to displaying an alert screen on the display 58 of the operation panel 55 before the print operations. Further, that may correspond to limiting practical print modes, for example, printing by the high picture quality mode or the double-side print mode, printing on un-proper sheets, and etc. And also, that may correspond to limiting print speeds.

As described above in this embodiment, when a reproduced toner cartridge is loaded, the ID uniquely given to the toner cartridge and access information directing to a server owned by a vendor providing the toner cartridge are read out from the memory chip 17 thereof, and then if the ID is registered in the server, print operations are permitted. In other words, if the toner cartridge is provided from one of a plurality of vendors which access information are stored in the memory chip 17 thereof, print operations are not limited, and thus users can select and purchase a preferable one among those provided from the plurality of vendors. That would enable users to have more choices of toner cartridges.

It is highly important in this embodiment that users arbitrarily can select a preferable toner cartridge in pure consideration of price and etc., by including in the plurality of vendors providing the toner cartridge, at least one third party vendor which product quality is guaranteed by the manufacturer of the image forming apparatus 1.

Further, in this embodiment, it is judged whether or not the toner cartridge is a reproduced product, and only if the toner cartridge is judged to be a reproduced product, it is further judged whether or not the ID thereof is registered. And thus, information about a new toner cartridge that is more likely to be a proper product is not read out from the memory chip 17 thereof and an access to the server is not made to check whether or not the ID is registered, which would reduce the unnecessary operations and improve processing efficiency.

Further, in this embodiment, access information of vendors providing the toner cartridge is stored in the memory chip 17 thereof. And thus, even if more vendors come to provide the toner cartridge after manufacturing the image forming apparatus 1, access information of new vendors can be only added in the memory chip 17 of toner cartridges to be provided as new products, and no additional operations such as updating a program to control the image forming apparatus 1 is necessary. Further, if there exists any of the vendors which access information are stored in the memory chip 17 thereof, which product quality becomes hardly guaranteed any more, the access information of such a vendor can be easily removed therefrom, which is also an advantage.

Explained above relates to one embodiment of the present invention. However, the present invention is not limited to this embodiment above.

For example, in this embodiment above, the present invention is applied to the case in which reproduced toner cartridges 16Y, 16M, 16C and 16K are loaded thereon. However, the present invention can be also applied to the case in which other supply units such as the imaging units 18Y, 18M, 18C and 18K are loaded thereon. In this case, the ID and access information of vendors, which are preliminarily stored in the memory chip 30 of the imaging units, are read out therefrom.

Further, in this embodiment above, a user using the image forming apparatus 1 sends to a vendor a supply unit to be replaced with a new one, and the vendor reproduces this supply unit and returns to the user. However, it can be also configured such that another reproduced product that is hold in this vendor's inventory is provided to the user using the image forming apparatus 1 before or when replacing, in order to make the image forming apparatus 1 always ready.

Further, in this embodiment above, the vendors providing supply units own the servers 2, 3 and 4 to register the IDs, respectively. However, it can be also configured such that a plurality of vendors which product quality is guaranteed by the manufacturer of the image forming apparatus 1 own one shared server to register the IDs, which could reduce the total number of servers.

Further, in this embodiment above, a MFP is employed as an image forming apparatus, for example. However, as a matter of course, this present invention can be also applied to a different image forming apparatus such as a copier or printer as long as it uses supply units.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
- an image former that prints target data on a sheet;
- a first judger that judges whether or not a supply unit that is replaceably loaded thereon and has a memory storing identification information uniquely given to the supply unit and information about a plurality of vendors providing the supply unit, is a reproduced product, the plurality of vendors including a third party vendor;
- an accessor that accesses a server owned by the third party vendor supplying the supply unit according to the information about the vendors providing the supply unit, which is stored in the memory of the supply unit, if the first judger judges that the supply unit is a reproduced product;
- a second judger that judges whether or not the identification information stored in the memory of the supply unit is registered in the server owned by the vendor supplying the supply unit, which is accessed by the accessor; and
- a controller that limits print operations performed by the image former if the second judger judges that the identification information is not registered in the server, meanwhile, permits print operations performed by the image former if the second judger judges that the identification information is registered in the server.

2. The image forming apparatus recited in claim 1, wherein the identification information of the supply unit and the information about the vendors providing the supply unit are stored in the ROM area of the memory of the supply unit.

3. The image forming apparatus recited in claim 1, wherein limiting print operations corresponds to displaying an alert message before printing.

4. The image forming apparatus recited in claim 1, wherein limiting print operations corresponds to limiting practical print modes and/or limiting print speeds.

5. The image forming apparatus recited in claim 1, wherein the identification information is stored in the memory so as to be only readable.

6. A print control method to control an image forming apparatus, comprising:
- judging whether or not a supply unit that is replaceably loaded on the image forming apparatus and has a memory storing identification information uniquely given to the supply unit and information about a plurality of vendors providing the supply unit, is a reproduced product, the plurality of vendors including a third party vendor;
- accessing a server owned by the third party vendor providing the supply unit according to the information about the vendors providing the supply unit, which is stored in the memory of the supply unit, if it is judged that the supply unit is a reproduced product;
- judging whether or not the identification information stored in the memory of the supply unit is registered in the server owned by the vendor providing the supply unit, which is accessed in the prior step; and
- limiting print operations if it is judged that the identification information is not registered in the server, meanwhile, permitting print operations if it is judged that the identification information is registered in the server.

7. The print control method to control an image forming apparatus, which is recited in claim 6, wherein the identification information of the supply unit and the information about the vendors providing the supply unit are stored in the ROM area of the memory of the supply unit.

8. The print control method of an image forming apparatus, which is recited in claim 6, wherein limiting print operations corresponds to displaying an alert message before printing.

9. The print control method of an image forming apparatus, which is recited in claim 6, wherein limiting print operations corresponds to limiting practical print modes and/or limiting print speeds.

10. A non-transitory computer readable recording medium storing a print control program which makes a computer of the image forming apparatus execute:
- judging whether or not a supply unit that is replaceably loaded on the image forming apparatus and has a memory storing identification information uniquely given to the supply unit and information about a plurality of vendors providing the supply unit, is a reproduced product, the plurality of vendors including a third party vendor;
- accessing a server owned by the third party vendor providing the supply unit according to the information about the vendors providing the supply unit, which is stored in the memory of the supply unit, if it is judged that the supply unit is a reproduced product;
- judging whether or not the identification information stored in the memory of the supply unit is registered in the server owned by the vendor providing the supply unit, which is accessed in the prior step; and
- limiting print operations if it is judged that the identification information is not registered in the server, meanwhile, permitting print operations if it is judged that the identification information is registered in the server.

11. The non-transitory computer readable medium storing the print control program recited in claim 10, wherein the identification information of the supply unit and the information about the vendors providing the supply unit are stored in the ROM area of the memory of the supply unit.

12. The non-transitory computer readable medium storing the print control program recited in claim 10, wherein limiting print operations corresponds to displaying an alert message before printing.

13. The non-transitory computer readable medium storing the print control program recited in claim 10, wherein limiting print operations corresponds to limiting practical print modes and/or limiting print speeds.

* * * * *